United States Patent
Berglund et al.

(10) Patent No.: US 7,422,544 B2
(45) Date of Patent: *Sep. 9, 2008

(54) ENGINE DRIVEN VEHICLE WITH EXHAUST EMISSION CLEANING

(75) Inventors: Sixten Berglund, Torslanda (SE); Anders Eriksson, Göteborg (SE); Marcus Steen, Angered (SE); Lucas Megas, Göteborg (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 11/534,121

(22) Filed: Sep. 21, 2006

(65) Prior Publication Data

US 2007/0225116 A1   Sep. 27, 2007

Related U.S. Application Data

(63) Continuation of application No. PCT/SE2005/000423, filed on Mar. 22, 2005.

(30) Foreign Application Priority Data

Mar. 23, 2004 (SE) .................................... 0400773

(51) Int. Cl.
*F16H 59/78* (2006.01)
*B60W 10/04* (2006.01)
*B60W 10/10* (2006.01)

(52) U.S. Cl. ........................ 477/100; 477/110; 477/111; 477/98

(58) Field of Classification Search ................. 477/107, 477/111, 110, 98, 100; 701/102, 103, 108
See application file for complete search history.

(56) References Cited

U.S. PATENT DOCUMENTS

| | | | |
|---|---|---|---|
| 4,388,803 A | * | 6/1983 | Furuya et al. ................ 60/284 |
| 5,265,693 A | | 11/1993 | Rees et al. |
| 5,609,218 A | | 3/1997 | Yamashita et al. |

(Continued)

FOREIGN PATENT DOCUMENTS

FR   2820462 A1 *   8/2002

(Continued)

OTHER PUBLICATIONS

International Search Report for corresponding International Application PCT/SE2005/0000423.

(Continued)

*Primary Examiner*—Sherry Estremsky
(74) *Attorney, Agent, or Firm*—WRB-IP LLP

(57) ABSTRACT

A method of producing lower emissions in the operation of a vehicle includes an internal combustion engine which gives off exhaust gases to an exhaust system comprising a catalytic converter, injectors which are designed to inject hydrocarbon into at least one of the exhaust system and the engine combustion chamber, and a transmission that can be driven by the engine. The method includes a step in which a gear in the vehicle transmission is selected as a function at least of information that catalytic conversion is required and information on the temperature in the exhaust system, so that the gear selected regulates the temperature in the exhaust system. The catalytic converter is preferably of the LNC (Lean NO, Catalyst) type.

15 Claims, 5 Drawing Sheets

U.S. PATENT DOCUMENTS

| | | | |
|---|---|---|---|
| 5,772,556 A | 6/1998 | Tinschert et al. | |
| 6,196,207 B1 * | 3/2001 | Megas | 123/572 |
| 6,584,393 B1 | 6/2003 | Vollmar | |
| 2006/0196285 A1 * | 9/2006 | Steen et al. | 74/335 |
| 2007/0000520 A1 * | 1/2007 | Steen et al. | 134/22.1 |

FOREIGN PATENT DOCUMENTS

| | | |
|---|---|---|
| JP | 2002106334 | 4/2004 |
| WO | WO 2004088100 A1 * | 10/2004 |
| WO | WO 2004109160 A1 * | 12/2004 |
| WO | WO 2005019616 A1 * | 3/2005 |

OTHER PUBLICATIONS

Chinese Official Action from corresponding Chinese Application No. 200580009190.2.

* cited by examiner

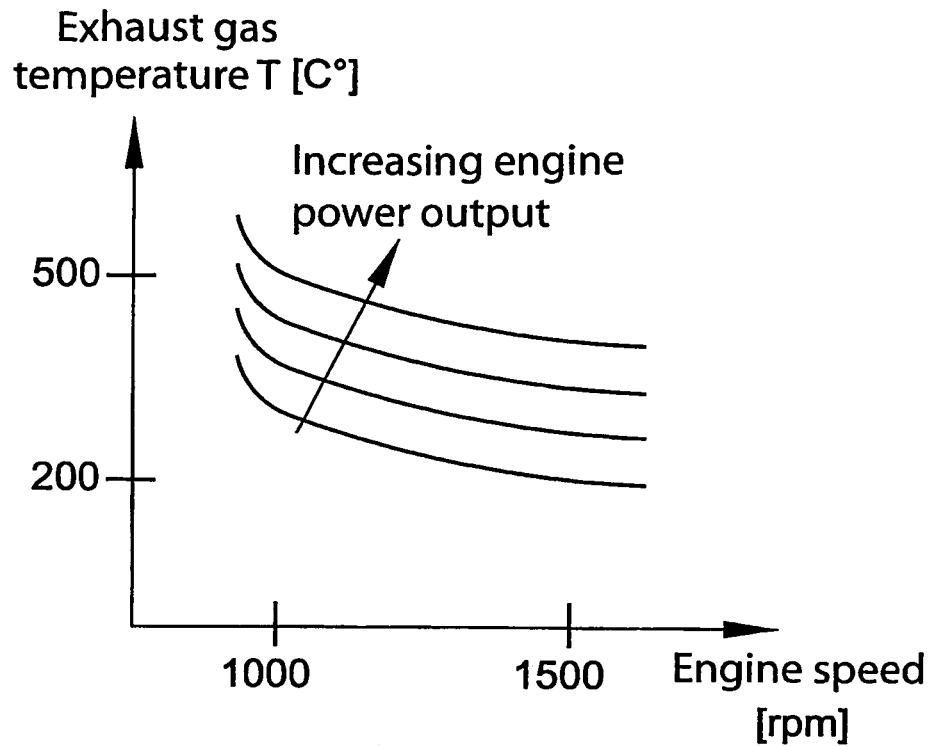
FIG. 3c
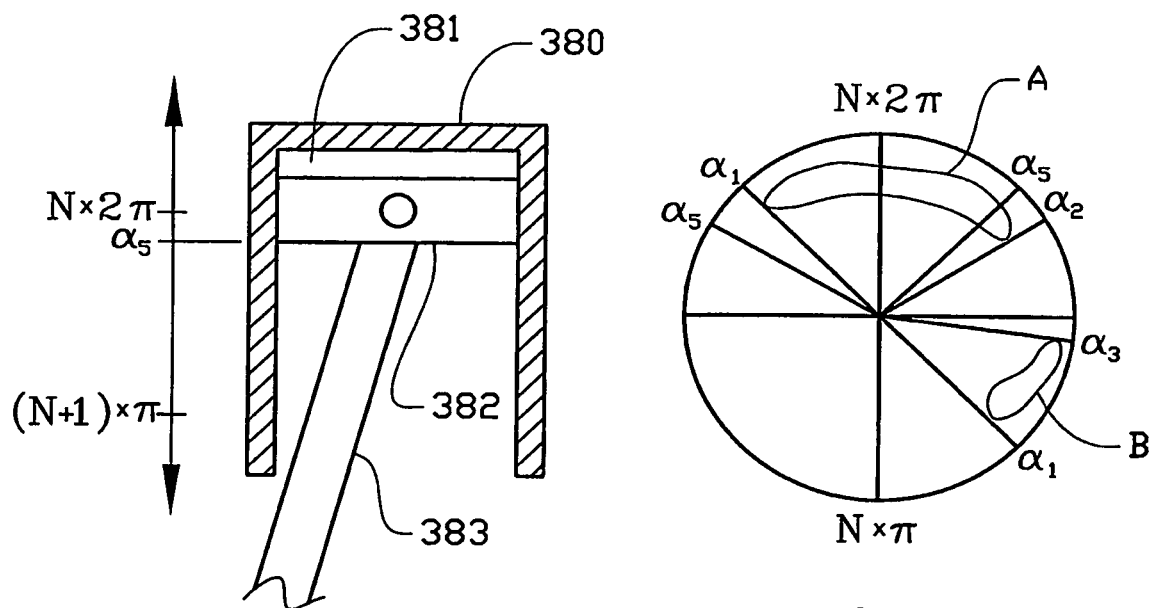
FIG. 3d
FIG. 3e

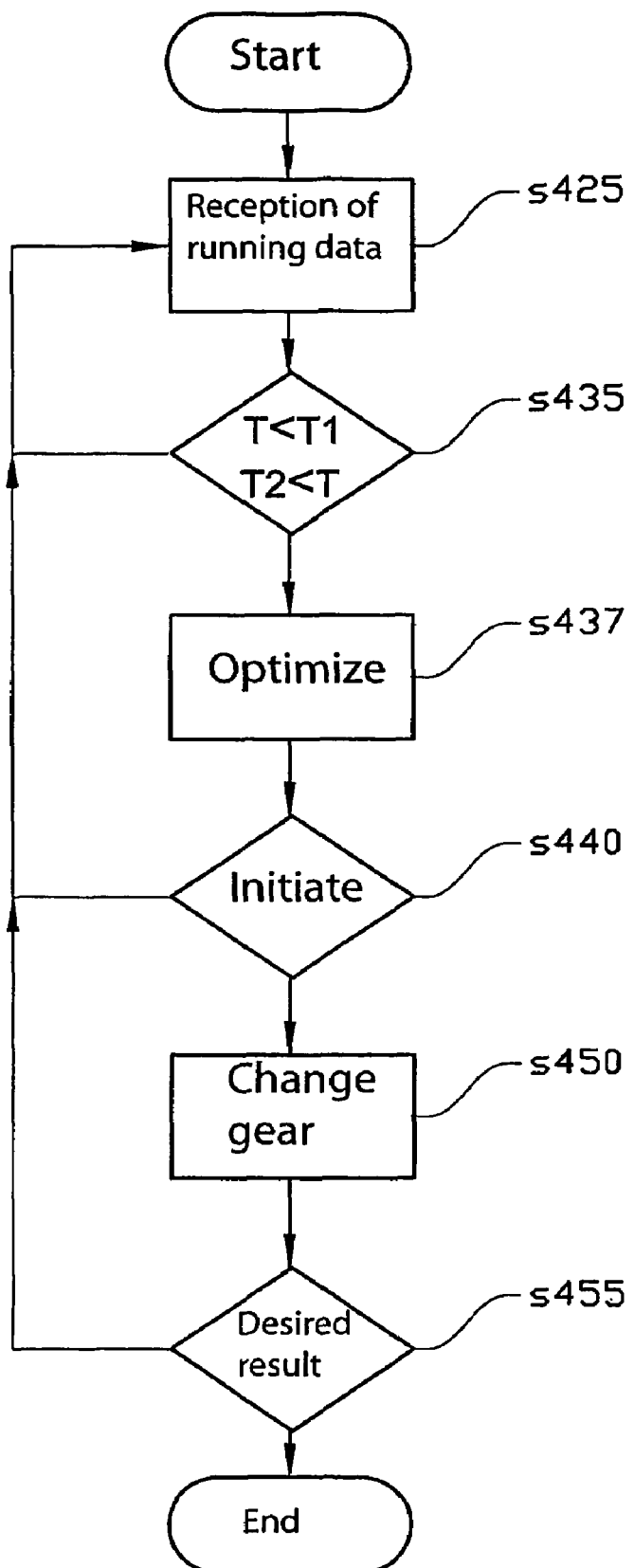
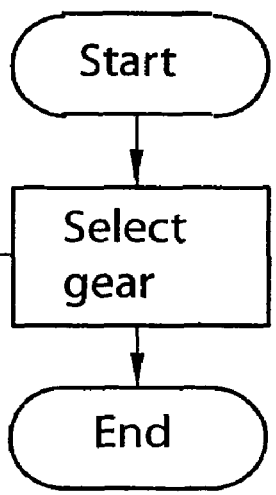
FIG.4a
FIG.4b

ENGINE DRIVEN VEHICLE WITH EXHAUST EMISSION CLEANING

BACKGROUND AND SUMMARY

The present application is a continuation of International Application PCT/SE2005/000423, filed Mar. 22, 2005, which claims priority to SE 0400773-8, filed Mar. 23, 2004, both of which are incorporated by reference.

The present invention relates to a method of producing lower emissions in the operation of a vehicle comprising an internal combustion engine which gives off exhaust gases to an exhaust system comprising a catalytic converter, injectors which are designed to inject hydrocarbon into the exhaust system or into the engine combustion chamber, and a transmission that can be driven by the engine.

The present invention also relates to an engine-driven vehicle comprising an internal combustion engine which in operation gives off exhaust gases to an exhaust system, comprising a catalytic converter, control elements, injectors, which are designed to inject hydrocarbon into the exhaust system or into the engine combustion chamber, and a transmission that can be driven by the engine.

The present invention also relates to a computer program for performing such a method on a computer.

In engine-driven vehicles catalytic converters of various types are nowadays used for exhaust emission control in order to achieve lower emissions. These catalytic converters are used in order to reduce to some extent the discharges of nitrogen compounds (NOx), for example. Due to various factors the catalytic converters may function less efficiently, the quantity of exhaust gases converted into nitrogen gas, carbon dioxide or water, for example, being reduced, which results in unnecessarily high exhaust emissions in the operation of said vehicles.

It is desirable to provide a method of cost-effectively achieving lower emissions from an engine-driven vehicle.

According to an aspect of the present invention, a method of the type specified in the introductory part includes selecting a gear in the vehicle's transmission as a function at least of information that catalytic conversion is required and information on the temperature in the exhaust system, so that the gear selected regulates the temperature in the exhaust system.

One advantage accruing from this solution is obtained through the use of synergetic effects of interaction between the transmission and the internal combustion engine, which in operation gives off exhaust gases to the exhaust casing. This advantage can be obtained by selecting the engine speed and the transmission gear when the vehicle is in operation in such a way that the rotational speed of the transmission output shaft is basically maintained whilst the engine speed is adjusted so that the exhaust gas temperature varies. This temperature adjustment in turn produces the lower exhaust emissions. This solution becomes very cost-effective, since according to the invention the vehicle does not need to be fitted with additional components. The method according to the invention means that the catalytic converter can be used for a longer period of time, since it is not exposed to such high stresses as previously, and in particular to high temperatures. With the method, exhaust emission control in motor vehicles can function better in practice. Since this gives the catalytic converter the advantage of a longer service life, it does not need to be removed from the vehicle for repair or replacement as often as hitherto, which means that the invention is both economic and time-saving, since the vehicle therefore does not need to be brought into a workshop as frequently.

A well-controlled temperature in the exhaust system minimizes the risk that the hydrocarbon used as reagent in various methods of reducing emissions will be destroyed by excessively high temperatures, for example, or become ineffective at excessively low temperatures. A further advantage of an aspect of the invention is that the risk of hydrocarbon escape (that is to say, non-reacting hydrocarbon) is reduced, especially in the case of transients, in that the temperature in the catalytic converter can be better controlled. Through improved control of the temperature in the catalytic converter the duty cycle of the catalytic converter can be increased. An aspect of the invention makes it possible to predict more accurately what will occur in the catalytic converter and in this way the thermal mass can be managed so that the reaction in the catalytic converter can be maintained for a longer period of time during a transient process.

According to one aspect of the invention lower emissions are achieved with the aid of a catalytic converter in a vehicle exhaust system. The catalytic converter may be of the LNC (Lean NOx Catalyst) type. By actively changing the gear on the vehicle driveline whilst maintaining the engine power output, even at low revolutions, it is possible to obtain an optimum temperature for an LNC catalyst. The optimum temperature may lie in a range in the order of 350° C. At an optimum catalytic converter temperature it is possible to achieve a more efficient catalysis between, for example, a hydrocarbon (HC compounds) injected into the exhaust system and NOx compounds, so that a larger quantity of nitrogen gas, carbon dioxide and water is formed in the catalytic converter. The nitrogen gas, the carbon dioxide and the water can then be expelled from the exhaust system. The method involves coordinated control of the engine and transmission.

With a temperature sensor a control unit can determine when it is time to improve the catalysis in the catalytic converter. In response to a signal, or from calculations, the control unit can temporarily deviate from stored gear selection strategies and any optimum fuel consumption in order to adjust the temperature in the vehicle exhaust system and hence also the temperature of a hydrocarbon injected into the exhaust system. For example, at a high engine output a control unit can actively switch to a temperature-limiting strategy. In concrete terms, this may mean downshifting gears in the transmission. At constant engine output, the temperature in the exhaust system falls as the engine speed increases. When the temperature in the exhaust system and hence also the substrate temperature has reached the required temperature, an ordinary gear selection strategy can be applied. The control unit is also designed to consider whether it is more advantageous to adjust the temperature at a later stage rather than on receipt of the initial signal.

BRIEF DESCRIPTION OF THE DRAWINGS

The features and advantages of the present invention are well understood by reading the following detailed description in conjunction with the drawings in which like numerals indicate similar elements and in which:

FIG. 3c shows a diagram of how various constant engine outputs vary in respect of temperature and engine speed. FIG. 3d shows a schematic representation of a vehicle combustion chamber. FIG. 3e shows a schematic representation of a fuel injection sequence into a combustion chamber, according to the present invention.

FIG. 4a shows a flow chart illustrating a method according to one embodiment of the invention. FIG. 4b shows a flow chart illustrating a more detailed method according to one embodiment of the invention.

DETAILED DESCRIPTION

Figure 1:
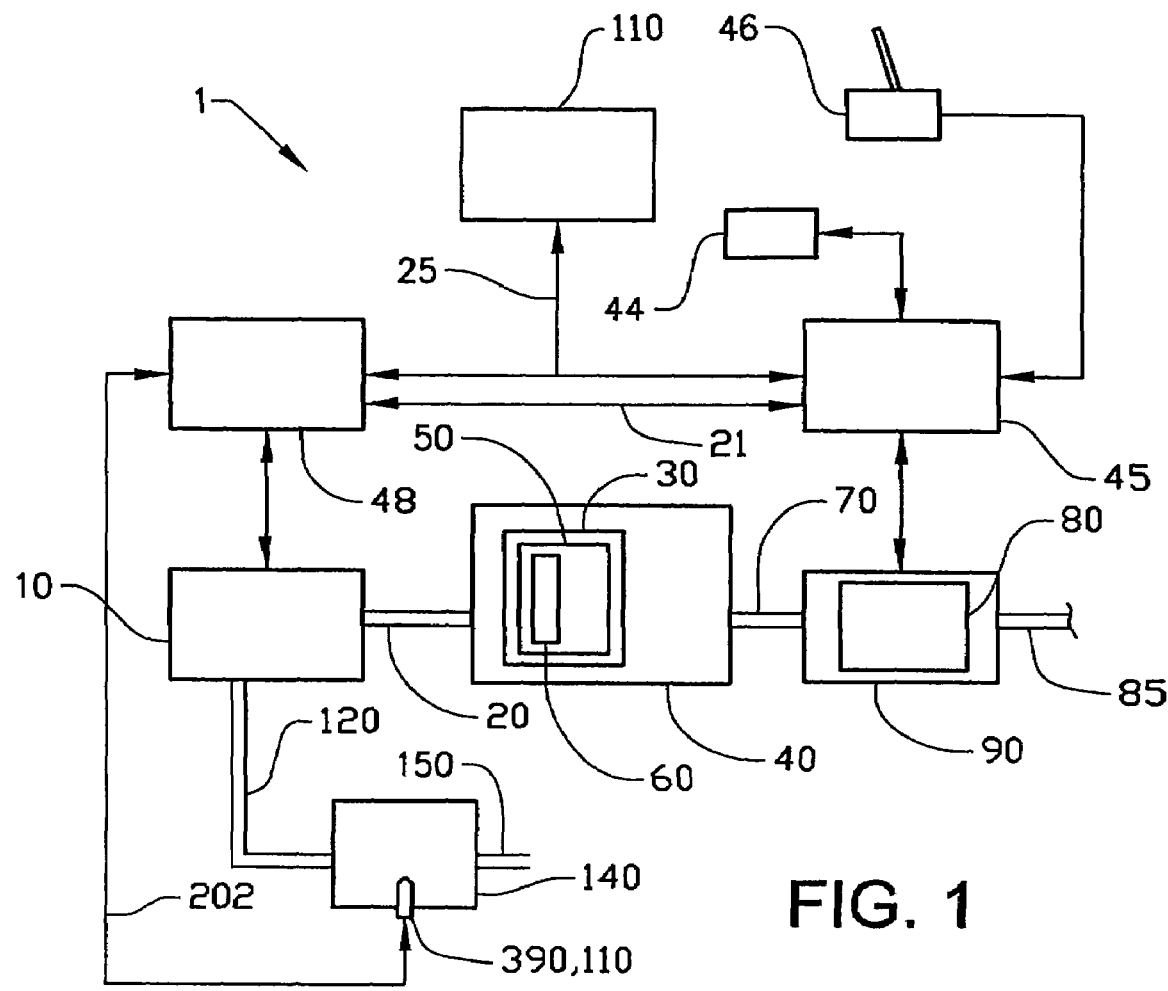
FIG. 1 shows a schematic representation of a vehicle and a control system for this.

FIG. 1 shows a schematic representation of a vehicle 1 and a control system for this according to one embodiment of the present invention, in which 10 denotes a multi-cylinder internal combustion engine, for example a diesel engine, the crankshaft 20 of which is coupled to a dry single-plate clutch, generally denoted by 30, which is enclosed in a clutch cover 40. Instead of a single-plate clutch a two-plate clutch may be used. The crankshaft 20 is connected, rotationally locked, to the clutch housing 50 of the clutch 30, while the plate 60 thereof is connected and rotationally locked to an input shaft 70, which is rotatably supported in the housing 80 of a gearbox generally denoted by 90. A main shaft and an intermediate shaft are also rotatably supported in the housing 80. An output shaft 85 from the gearbox 90 is designed to drive the wheels of the vehicle.

A first pipe 120 is designed to carry exhaust gases from the engine combustion chamber to an exhaust casing 140, the casing 140 being designed for exhaust emission control. A second pipe 150 is designed to carry treated exhaust gases, and the remainder of the untreated exhaust gases, from the casing 140 out of the vehicle.

Also illustrated is a first control unit 48 for controlling the engine 10 and a second control unit 45 for controlling the transmission. The first and second control units are designed to communicate with one another via a data bus 21. It will be described below how various processes and steps of the method are performed in the first control unit 48, but it should be apparent that the invention is not limited to this, it being equally possible to use the second control unit 45, or a combination of the first and second control units.

Sensors, detectors, transducers and injection control device have the generic designation of detector element 110. The detector elements 110 are designed to communicate with both the first and the second control unit via a data bus 25. The detector elements 110 may comprise, for example, an exhaust gas temperature gauge 390, which may be located adjoining the casing 140. In one embodiment the detector elements 110 may be at least one fuel injector designed to deliver fuel to the engine combustion chamber. In one embodiment the detector elements 110 may be at least one fuel injector, also referred to as an injector, designed to deliver fuel directly to the vehicle exhaust system, in which at least one catalytic converter is located. The first control unit 48 is designed to receive running data, such as the fuel combustion quantity and the instantaneous engine load, for example, from the detector elements 110, and to process running data in order to calculate the vehicle exhaust emissions in real time, for example. The first control unit 48 is specially designed to receive information indicating the temperature in the exhaust system.

The temperature in the exhaust system may be a qualitative mean value of a number of temperature gauges located in and adjacent to the vehicle exhaust system.

The vehicle 1 comprises a throttle lever 44 and a manual gear selector 46, which is designed to communicate with the second control unit 45. The gear selector 46 may have a position for manual shifting and a position for automatic vehicle gear changes.

Figure 2:
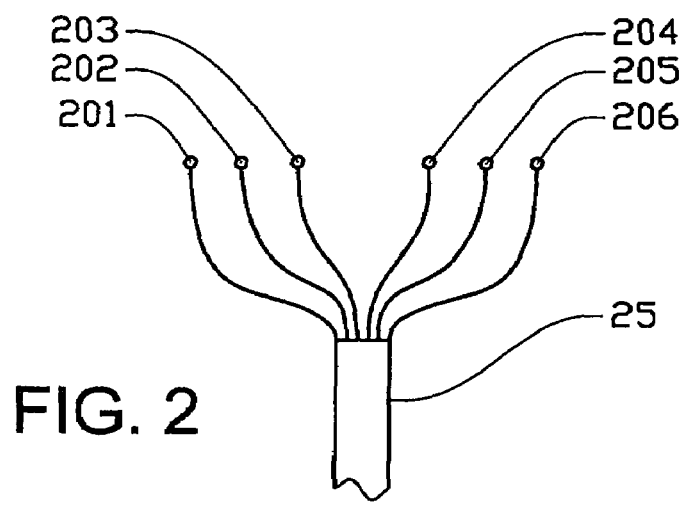
FIG. 2 shows a data bus with examples of detected or calculated data used according to the invention.

FIG. 2 shows a data bus 25 and examples of running data registered or calculated by the detector elements 110. Examples of detected or calculated instantaneous parameters are the engine torque 201, exhaust gas temperature 202, engine power output 203, vehicle acceleration 204, exhaust gas back-pressure 205 and fuel consumption 206. Other parameters may be the injection timing, EGR valve position, NOP (Needle Opening pressure) and the NOx concentration in treated exhaust gases. From the aforementioned parameters the first control unit 48 can calculate the exhaust emissions, for example. The calculations are preferably performed in real time.

The aforementioned parameters may be measured directly by means of measuring devices for measuring the respective parameters. Alternatively the respective parameters may be calculated indirectly by observing parameters other than each of said parameters, for example by model-based estimation.

Figure 3A:
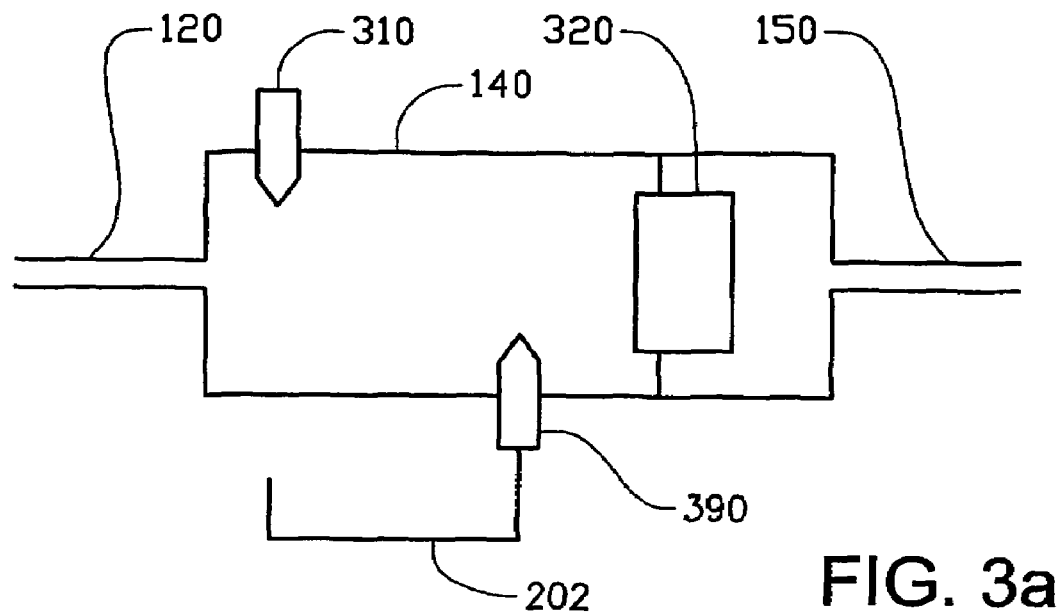
FIG. 3a shows a schematic representation of an exhaust system for a vehicle.

FIG. 3a shows a schematic representation of an exhaust system according to one embodiment of the invention. The first pipe 120 is designed to carry exhaust gas particulates from the vehicle combustion chamber to the casing 140 in which the exhaust gases are fully or partially treated. The second pipe 150 is further designed to carry the treated exhaust gases from the casing 140 out of the vehicle 1. The casing 140 may be composed of stainless steel. The casing 140 comprises an injector 310, which according to one embodiment of the invention may be a hydrocarbon injector. Hydrocarbon could also be injected into the engine combustion chamber, for example, through a post-injection via the engine fuel injection system or alternatively through separate injectors arranged in the combustion chamber. In a further embodiment hydrocarbon can be injected both into the combustion chamber and into the exhaust system simultaneously. The first control unit 48 is designed to control the injection of hydrocarbon into the casing 48, for example, via the injector 310 or into the combustion chamber via the engine fuel injection system, or via an injector arranged separately in the catalysis combustion chamber. The casing 140 further comprises a catalytic converter 320, which according to a preferred embodiment of the invention may be of the LNC type of catalytic converter. The desired end products coming from the LNC catalytic converter are nitrogen gas ($N_2$) and water ($H_2O$). A further product that is obtained when hydrocarbon is used as reducing agent is carbon dioxide ($CO_2$). The LNC catalytic converter 320 may be composed of a ceramic material and have a catalytic coating. Hydrocarbon (HC-compound) is capable of reacting chemically with NOx compounds in the catalytic converter 320 under certain temperature conditions. Such a reaction can be started by adjusting the temperature in the casing 140 to a suitable value. The result of such a reaction is primarily nitrogen gas and water. The water may be in gaseous form. The second pipe 150 is designed, after catalysis, to carry the nitrogen gas and the water and other gases present in the exhaust gases from the casing 140 out of the vehicle 1.

Figure 3B:
FIG. 3b shows a diagram of the degree of conversion of NOx in a catalytic converter.
Figure 3B:
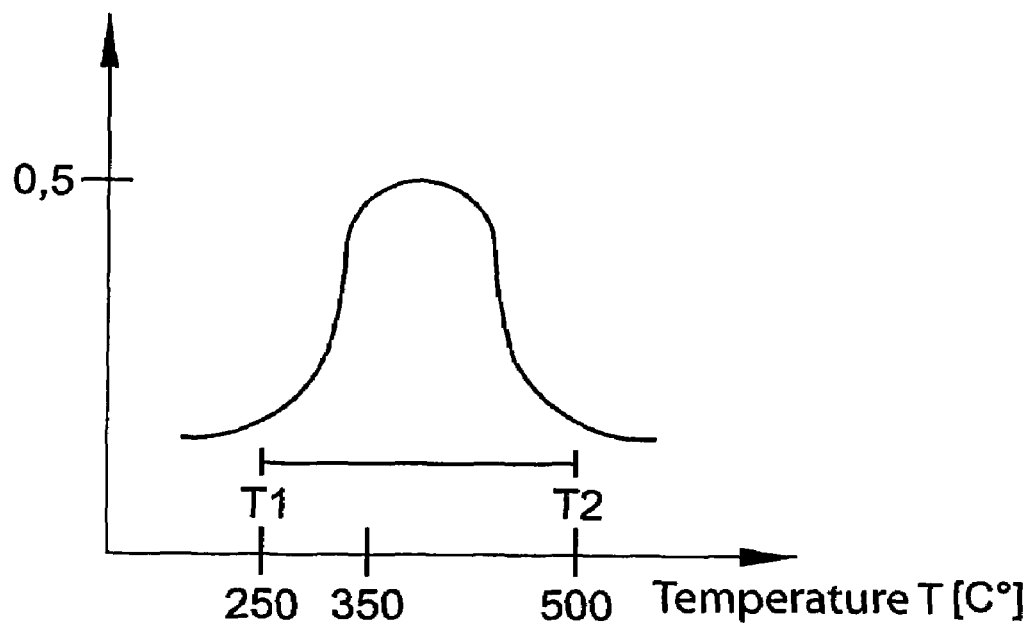

FIG. 3b illustrates how the degree of conversion of NOx compounds to $N_2$ in the catalytic converter varies as a function of the exhaust gas temperature. The degree of conversion also varies as a function of the catalytic converter temperature and the injection of hydrocarbon into the exhaust system. It can be seen from the figure that the highest degree of conversion, in this example 0.5, is obtained at a temperature of approximately 350° C. It will also be seen that the degree of conversion is relatively high within a temperature range T1-T2. This temperature range may be between 250 and 500° C.

FIG. 3c illustrates how various constant engine outputs vary as a function of the exhaust gas temperature T[° C.] in the vehicle exhaust system, and of the engine speed trpm]. FIG. 3c shows that if the engine speed falls and engine power output remains constant the exhaust gas temperature increases. The figure also shows that a higher exhaust gas temperature can be obtained for a higher constant engine power output when the engine speed is reduced.

FIG. 3d illustrates an internal combustion chamber in an engine in the vehicle. A cylinder head 380 encloses a combustion chamber 381, in which combustion chamber a piston 382 is displaceably arranged. The piston 382 may be connected to a crankshaft (not shown in the figure) by means of a connecting rod 383 for propelling the vehicle. FIG. 3d also illustrates the position of the piston in the combustion chamber 381. At the top dead center (TDC) the position of the piston is indicated by a whole multiple of $2\pi$ radians. The whole multiple N is defined as a positive integer, including 0, that is to say N=0, 1, 2, 3 . . .

At the bottom dead center (BDC) the position of the piston is specified by a whole multiple N added to 1 of $\pi$ radians $((N+1)-\pi)$. A four-stroke engine has a cycle of $4\pi$ radians.

FIG. 3e shows the position of the piston in the combustion chamber 381 and an exemplary embodiment of the combustion chamber fuel injection according to the invention. The instantaneous position of the piston shown in FIG. 3d is represented in FIG. 3e by an angle as.

Normal injection of fuel into the engine combustion chamber is indicated by an area A. The area A is defined by an angle $a_1$ and an angle $a_2$. In the same way a second injection (post injection) is indicated by an area B. The area B is defined by an angle $a_3$ and an angle $a_4$.

The control unit 48 is designed to control the delivery of fuel to the vehicle combustion chamber. According to the invention the control unit 48 is designed, in particular, to control the fuel delivery in such way as to optimize the degree of conversion of NOx and HC compounds in the catalytic converter 320.

FIG. 4a shows a flow chart illustrating a method of obtaining lower emissions in an engine-driven vehicle according to one embodiment of the invention.

The method comprises the step s401 in the operation of a vehicle comprising an internal combustion engine 10, which gives off exhaust gases to an exhaust system 140 comprising a catalytic converter 320, injectors 310, 110 which are designed to inject hydrocarbon into the exhaust system and/or into the combustion chamber of the engine 10, and a transmission 90 that can be driven by the engine, characterized in that the method comprises the following step:

selection of a gear in the vehicle transmission as a function at least of information that catalytic conversion is required and information on the temperature (T) in the exhaust system, so that the gear selected regulates the temperature in the exhaust system.

According to one embodiment of the invention hydrocarbon is capable of reacting with NOx gases under the effect of the temperature in the catalytic converter 320. These components are converted to nitrogen gas, carbon dioxide and water, which can then be conveyed out of the exhaust system via the pipe 150.

FIG. 4b shows a more detailed flow chart illustrating a method according to one embodiment of the invention. The method comprises the step s425 in which the first control unit 48 receives running data such as 201-206, for example, from the detector elements 110.

T may be a qualitative value of the exhaust gas temperature in the vehicle exhaust system. T may also be the temperature in the casing 140 or the temperature of the casing 140 itself or the temperature of the catalytic converter 320.

T1 and T2 respectively represent a first and a second limit value, between which the temperature T should lie in order to obtain a qualitative catalysis in the catalytic converter 320. T1 may be a lower limit of 250° C. T2 may be an upper limit of 500° C.

According to another embodiment T1 may be 275° C. and T2 may be 475° C.

In an alternative embodiment of the invention the determination of T1 and T2 can be adjusted to the prevailing vehicle conditions by continuously measuring the NOx concentration in the exhaust gases leaving the catalytic converter. The measurement may be undertaken by a NOx sensor, the signal from which is fed back to the control unit 48.

In step s435 the control unit 48 compares T with the stored, predetermined T1 and T2. If T is greater than T2, this indicates that there is a need to reduce the temperature in the exhaust gas system, and step s437 of the method ensues. If the comparison shows that T is less than T1, this indicates that there is a need to increase the temperature in the exhaust system, and step s437 of the method ensues. Otherwise the loop returns to step s425 of the method.

In one embodiment of the invention, in the event of a return to step s425, the temperature range is reduced before the next initiation in order to optimize said degree of conversion of NOx compounds to nitrogen gas. The system is capable, where necessary, of automatically restoring the reduced range T1-T2. Step s437 of the method involves a qualitative optimization of whichever gear is best in order to achieve a desired result in terms of temperature control in the exhaust system. The optimization can be undertaken by co-ordination with a gear selection strategy stored in the second control unit 45. The optimization may be based on a number of different parameters, such as gear on the driveline and length of time in the shifted driveline gear. This serves to determine how long any shifted gear on the vehicle driveline is to be maintained and what outcome it is desirable to achieve, that to say, for example, what final temperature the exhaust system or the substrate in the catalytic converter 320 must achieve.

In step s440 of the method it is determined whether implementation of the optimization must be initiated immediately or whether initiation at a later stage is better. One example of a traffic situation in which initiation is preferably deferred to a later stage may be when the vehicle is traveling uphill and changing up in order to produce a temperature increase in the exhaust system would be less appropriate, since the engine would be obliged to run at too low an engine speed. If initiation is not to occur immediately, the loop returns to s425.

After initiation, this is implemented in step s450 of the method, the gear on the vehicle driveline if necessary being changed. The gear can be changed in one or more steps. For example, the gear may be changed from a fifth gear to a third gear in order to produce a temperature reduction in the exhaust system over a certain period of time. In step 455 of the method the result of the process is evaluated. This can be done with input from the detector elements 110, with the aid of models stored in the first control unit. If the result is the desired one or it is sufficiently good, the method is concluded, otherwise the loop returns to step s425 of the method.

Figure 5:
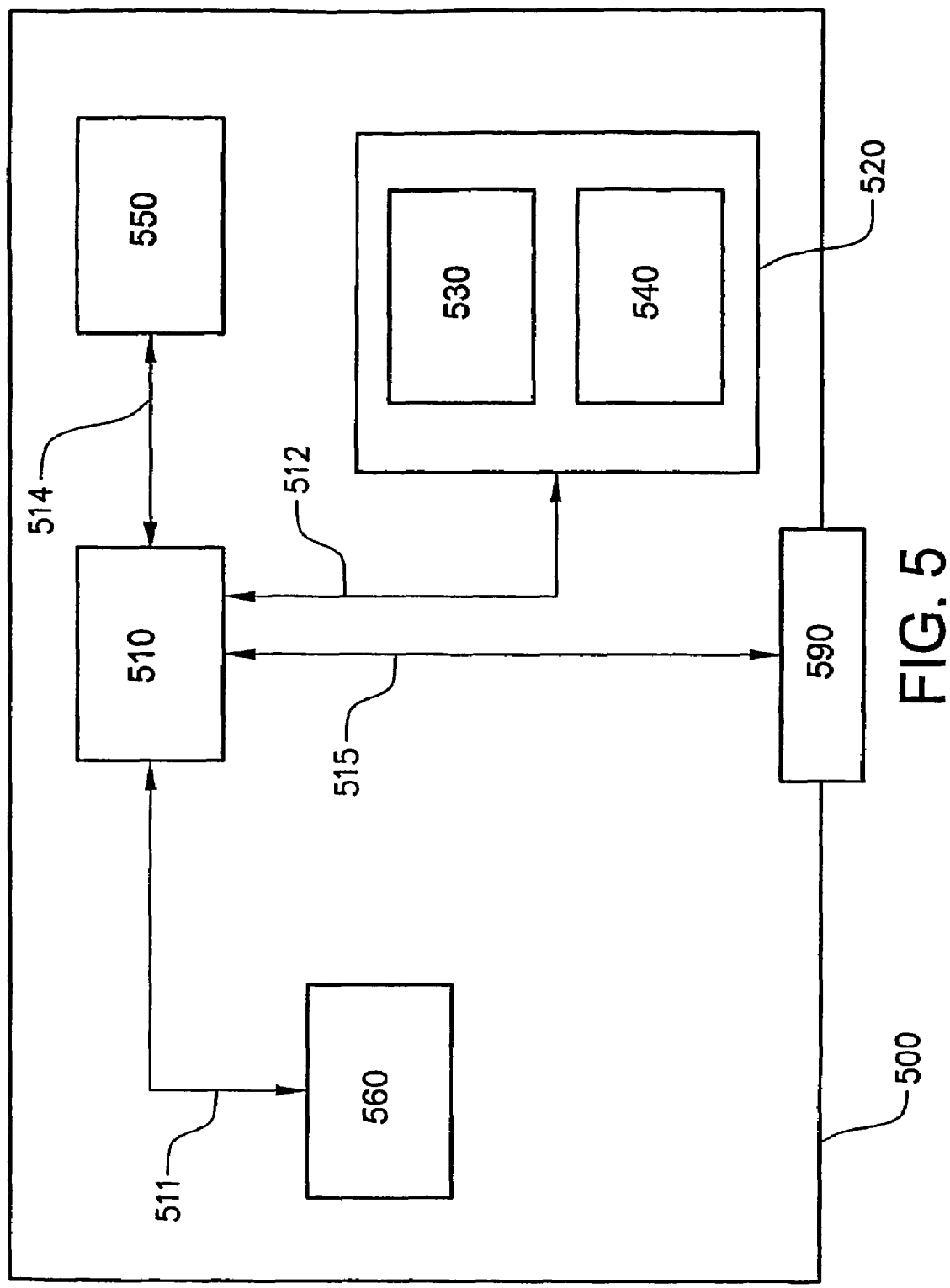
FIG. 5 shows an apparatus which is used according to at least one embodiment of the invention.

FIG. 5 shows an apparatus 500 according to one embodiment of the invention, comprising a non-volatile memory 520, a processor 510 and a read/write memory 560. The memory 520 has a first memory part 530, in which a computer program for controlling the apparatus 500 is stored. The computer program in the memory part 530 for controlling the apparatus 500 may be an operating system.

The apparatus 500 may be incorporated into a control unit, for example, such as the control unit 45 or 48. The data-processing unit 510 may comprise a microcomputer, for example.

The memory 520 also has a second memory part 540, in which is stored a program for exhaust emission control in an engine-driven vehicle according to the invention. In an alternative embodiment the program for exhaust emission control in an engine-driven vehicle is stored on a separate, non-volatile data storage medium 550, such as a CD, for example, or a replaceable semiconductor memory. The program may be stored in an executable form or in a compressed state.

Where the data-processing unit 510 is described below as running a special function, it should be clearly understood that the data-processing 510 runs a special part of the program that is stored in the memory 540 or a special part of the program that is stored on the non-volatile recording medium 550. The data processing unit 510 is adapted for communication with the memory 550 by means of a data bus 514. The data processing unit 510 is also adapted for communication with the memory 520 by means of a data bus 512. The data processing unit 510 is furthermore adapted for communication with the memory 560 by means of a data bus 511. The data processing unit 510 is also adapted for communication with a data port 590 by means of a data bus 515.

The methods which are described in FIG. 4a and FIG. 4b can be performed by the data processing unit 510 in that the data processing unit 510 runs the program, which is stored in the memory 540 or the program, which is stored on the non-volatile recording medium 550.

The hydrocarbon (the HC compound) that is injected may be in liquid or gaseous form. The hydrocarbon may be the ordinary vehicle fuel, for example diesel or petrol, or any other hydrocarbon which may differ from the vehicle fuel.

In an alternative embodiment the catalytic converter 320 may comprise two or more catalytic converters connected in series.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

The invention must not be regarded as being limited to the exemplary embodiments described above, a number of further variants and modifications being feasible without departing from the scope of the following claims.

What is claimed is:

1. A method of producing lower emissions in the operation of a vehicle comprising an internal combustion engine which gives off exhaust gases to an exhaust system comprising at least one catalytic converter, injectors arranged to inject hydrocarbon into at least one of the exhaust system and an engine combustion chamber, and a transmission that can be driven by the engine, comprising:

selecting a gear in the vehicle transmission as a function at least of information that catalytic conversion is required and information indicating temperature in the exhaust system, so that the gear selected regulates the temperature in the exhaust system so that the temperature in the exhaust system lies within a range between a first temperature and a second temperature, and wherein the first temperature is at least 250 degrees Celsius and the second temperature does not exceed 500 degrees Celsius.

2. The method as claimed in claim 1, wherein the gear in the vehicle transmission is selected as a function of a comparison between the information indicating the temperature in the exhaust system and information on a predetermined limit value.

3. The method as claimed in claim 2, wherein the gear in the vehicle transmission is selected so that the temperature of the exhaust system is regulated so that it lies within a range between a first temperature and a second temperature.

4. The method as claimed in claim 3, wherein the first and second temperature are determined adaptively as a function of prevailing vehicle conditions.

5. The method as claimed in claim 1, wherein the injection into the combustion chamber is done through one or more post-injections.

6. The method as claimed in claim 1, wherein the hydrocarbon that is injected comprises fuel ordinarily used to propel the vehicle.

7. A computer program comprising program code for performing the steps of the method in claim 1, when the computer program is executed on a computer.

8. A computer program product comprising program code stored on a computer-readable medium for performing the steps of the method in claim 1, when the computer program is executed on the computer.

9. A computer program product that can be loaded directly into an internal memory in a computer, comprising a computer program for performing the steps of the method in claim 1, when the computer program on the computer program product is executed on the computer.

10. An engine-driven vehicle comprising:

an internal combustion engine which in operation gives off exhaust gases to an exhaust system comprising at least one catalytic converter;

control elements;

injectors which are designed to inject hydrocarbon into at least one of the exhaust system and an engine combustion chamber; and a transmission that can be driven by the engine, wherein the control elements are arranged to select a gear in the vehicle transmission as a function at least of information that catalytic conversion is required and information on a temperature in the exhaust system, so that the gear selected regulates the temperature in the exhaust system so that the temperature in the exhaust system lies within a range between a first temperature and a second temperature, and wherein the first temperature is at least 250 degrees Celsius and the second temperature does not exceed 500 degrees Celsius.

11. The engine-driven vehicle as claimed in claim 10, wherein the control elements select the gear in the vehicle transmission as a function of a comparison between the information indicating the temperature of the exhaust system and information on a predetermined limit value.

12. The engine-driven vehicle as claimed in claim 11, wherein the control elements select the gear in the vehicle transmission so that the temperature of the exhaust system is regulated so that it lies within a range between a first temperature and a second temperature.

13. The engine-driven vehicle as claimed in claim 12, wherein the injection into the combustion chamber is done using the ordinary fuel injection system of the engine.

14. The engine-driven vehicle as claimed in claim 11, wherein the injection into the combustion chamber is done using the ordinary fuel injection system of the engine.

15. The engine-driven vehicle as claimed in claim 10, wherein the injection into the combustion chamber is done using the ordinary fuel injection system of the engine.

* * * * *